United States Patent [19]
Nees

[11] 3,902,986
[45] Sept. 2, 1975

[54] APPARATUS FOR PREPARATIVE ELECTROPHORESIS

[75] Inventor: Stephan Hubertus Anton Nees, Bochum, Germany

[73] Assignee: Colora Messtechnik GmbH, Germany

[22] Filed: Apr. 23, 1973

[21] Appl. No.: 353,641

[30] Foreign Application Priority Data
Apr. 29, 1972 Germany............................ 2221242

[52] U.S. Cl................................ 204/299; 204/180 G
[51] Int. Cl................................................ B01k 5/00
[58] Field of Search.................. 204/180 G, 299, 301

[56] References Cited
UNITED STATES PATENTS

| | | | |
|---|---|---|---|
| 3,326,790 | 6/1967 | Bergrahm | 204/180 G |
| 3,374,166 | 3/1968 | Raymond | 204/299 |
| 3,384,564 | 5/1968 | Ornstein et al. | 204/180 G |
| 3,704,217 | 11/1972 | Nerenberg | 204/180 G |
| 3,719,580 | 3/1973 | Roberts et al. | 204/299 |
| 3,791,950 | 2/1974 | Allington | 204/180 G |

Primary Examiner—John H. Mack
Assistant Examiner—A. C. Prescott
Attorney, Agent, or Firm—Cushman, Darby & Cushman

[57] ABSTRACT

A continuous preparative electrophoresis device is described having, within a single housing, a separation chamber defined by a separating gel layer and a carrier gel layer, each gel layer in contact with its respective buffer solution. The device is preferably provided with cooling coils. The liquids eluted are passed between the two gel layers in a single stream or preferably in a plurality of streams, then exhausted from the devices. The apparatus is relatively simple to construct and operate yet provides efficient processing all without the need for diaphragms as previously used.

12 Claims, 3 Drawing Figures

APPARATUS FOR PREPARATIVE ELECTROPHORESIS

BACKGROUND OF THE INVENTION

The invention relates to an apparatus for the preparative electrophoresis with a separating chamber, preferably for vertically standing plate-shaped separating gels and with means for a continuous elution. Similar devices with column-shaped separating chambers are already known. However, it has been recognized that the efficiency of these known apparatuses is not particularly good, especially the resolution and yield of the elution systems of known apparatuses are low, and the dilution of eluted substances is high.

The present invention has for its object an improved apparatus for the continuous process of preparative electrophoresis, the apparatus being improved as compared to prior procedures and apparatus. As used herein, the term "preparative" means the separation of substances in their natural state by electrophoresis.

Some of the disadvantages associated with prior art types of devices are as follows; The apparatus described in German application 20 56 129 which corresponds to Ser. No. 198,130 filed Nov. 12, 1971, now U.S. Pat. No. 3,773,645, an elution system can be attached to the lower end of a rectangular cross-section separating chamber. The elution system consists of an elution chamber with inlets and outlets for the elution liquid, whereby the elution chamber is connected electrically, by at least one semi-permeable diaphragm, with the buffer container which contains the electrode to which the substances that are to be separated migrate. The separating chamber is cooled by cooling coils.

The invention as described herein represents an improvement over the structures described in the earlier application of Stephan Nees and Wilhelm Schmidt filed on Nov. 12, 1971, under Ser. No. 198,130, the disclosure of which is incorporated herein by reference.

In the case of such an apparatus applicant has found that high losses can occur along the diaphragm, because the electrophoretically separated substances can escape through the pores of the diaphragm in the direction of the electric field from the elution chamber before they are seized by the elution liquid and have been washed out of the elution chamber. This, of course, is a distinct disadvantage. Adsorption along the membrane contributes to additional losses and by denaturing along the membrane, an additional portion of the mostly very sensitive separated substances is lost.

A further disadvantage which cannot be avoided by the known apparatus is the inadequate capacity for cooling of the elution chamber area. While prior apparatuses already have cooling arrangements which cool the separating chamber by way of the buffer liquids, which are connected with the electrodes, the desirable strong cooling of the lower end of the separating chamber and of the elution chamber area has not as yet been achieved on an effective basis. Insufficient cooling of these points manifests itself frequently in non-uniform broadening of the bands and is due to diffusion and thus it causes a low selectivity, poor yield of pure substance parts. As a result of insufficient cooling the biological activities of macro-molecules are especially damaged. While measures could be taken to provide proper cooling means, care must be taken so as not to obstruct the view of the elution chamber. For proper control of an electrophoresis (observing air bubbles in the elution chamber) the observation of the area of the elution chamber is of particular significance. In addition, prior to the present invention it has not been possible to produce elution chambers having relatively small volumes because the prior chambers have required minimum dimensions due to the nature of the material used. Larger chambers could not be eluated as quickly as was desired (in order to avoid mixing effects in the elution chamber) and the chamber was relatively costly to construct.

DETAILED DESCRIPTION OF THE INVENTION

The present invention avoids the above-mentioned drawbacks while, at the same time, providing high resolution, highest yields, small expenditure for apparatus and is simple to control.

The objects of the present invention are achieved by a novel chamber arrangement wherein the separating chamber is extended by two extension sectors in the direction of migration of the substances subjected to electrophoresis, whereby in a first extension section inlets and outlets for the elution liquid are provided, and the second extension sector acts as a repository for a carrier gel. The arrangement according to the invention provides an elution chamber without the use of diaphragms, thereby obviating the disadvantages of diaphragm-type devices of the prior art while also reducing the cost of constructing the electrophoresis apparatus.

The apparatus according to the present invention does, indeed, permit the use of a very simple process for the formation of the elution chamber. The process comprises pouring a carrier gel into the second extension zone, then coating this carrier gel in the area of the first extension zone with a layer of separating liquid, preferably a thin layer of glycerine, and then to stratify the actual separating gel onto the glycerine layer. After gelling in both zones, the separating liquid is evacuated, via the inlet or outlet as the case may be, which results in an elution chamber defined by the two gelled layers which, depending on the thickness of the stratified separating liquid, can be more or less thin. In order to achieve this relatively thin elution chamber, the inlets and outlets communicating with the elution chamber also are as thin as possible. Preferably, they are horizontal slits.

The height or thickness of the first extension zone is not critical and merely needs to correspond or be adjusted to the desired height of the elution chamber positioned between the two gel layers. In small elution chambers the flow velocity is quite high, even in the case of small elution liquid through-put, so that substances emerging from the separating gel are immediately washed away, which results in a considerable increase of the resolution of the apparatus.

In another embodiment of the present invention there are provided two sets of inlets and outlets for the elution liquids in communication with the first extension zone, whereby a first inlet and outlet set is adjacent to the separating chamber and the second inlet and outlet set is adjacent to the second extension zone. In this manner it is possible to use elution liquids with a considerably variable electric conductivity, so that on the one hand an electrical suction effect can be created at the lower end of the separating chamber by means of a field intensity gradient while at the same time exhibiting a braking effect within the elution chamber. This arrangement results in extreme selectivities and optimum yields. The electrical conductivities of the carrier gel, separating gel and the elution liquids passed between both sets of inlets may be adjusted with respect to each other.

For example, it is possible, according to this embodiment of the invention, to use a carrier gel having an increased specific electric conductivity as compared to the separating gel, the conductivity difference may be as much as a factor of 3 to 4. Similarly, the elution liquid closest to the separating chamber may have a reduced conductivity as compared to that of the separating gel, reduced as much as by a factor of 0.8 to 0.9. Also, the second elution liquid passed closest to the carrier gel may have an increased conductivity as compared to the conductivity of the separating gel, increased by a factor of 3 to 4, such that it matches the specific electrical conductivity of the carrier gel.

We have observed that the increase of the yields is considerable with this double elution system and again it can be achieved without special technical and apparatus expenditure. Preferably, the inlets and outlets in the case of this embodiment are superposed double slits.

The separated substances are withdrawn at the separation points of the two elution liquids. Both liquids consequently carry the substances from the elution chamber. The present invention also contemplates, as another embodiment, mixing together the two elution liquids after their emergence from the respective outlets of the elution chamber and for this purpose a common mixing device is provided.

In case of elution liquids with specific electric conductivities which deviate strongly from one another, a relatively large amount of heat develops in the area of the elution liquid with the lesser conductivity, so that adequate cooling of this area is necessary to prevent, for example, liquification or deterioration of the gel layers.

Accordingly, the separating chamber, including the first extension sector is provided on both sides with a buffer container and each buffer container is filled with an electrolyte. The buffer tanks are such that when filled with an electrolyte or buffer liquid, there is fluid and electrical communication with the separating chamber and, on the other hand, with the exposed surface of the second extension zone containing the carrier gel. In order to dissipate and remove heat from the system the two buffer containers are provided with cooling means, such as the cooling coils that are illustrated, such that the separation chamber is effectively cooled by contact with the buffer liquids as well as contacting and cooling the separating gel layer. As a practical result of this cooling arrangement, thermally conditioned distortions of the bands and a decrease of the selectivity and yield, as well as a chemical impairment of the substances can be avoided.

For appropriate usability and convenience of construction, parts of or the entire apparatus is made from a transparent or translucent inert substance. Preferred is glass although various thermoplastic materials may also be used. I have found that in addition to improved usability a glass wall adjacent the separating gel provides good adhesion and support of the gel such that the gel layer essentially supports itself. The cooling of the separation chamber including the separating gel zone by means of cooling coils made of glass as well as manufacture of all parts of the separating chamber from glass will permit the area of the elution chamber to be observed by the operator.

The process according to the present invention for carrying out optimum preparative electrophoreses with an apparatus according to the description herein is substantially characterized by the following process steps.

1. Introducing into the second extension area or zone first gel forming liquid which upon gelling forms a carrier gel, preferably of a high specific electric conductivity and with a portion thereof being glycerine;

2. Stratifying the first gel forming liquid in the area of the first extension area with a separating liquid, also preferably glycerin;

3. Stratifying the thus-applied liquid in the area of the separating chamber, preferably after the gelling of the first gel forming liquid to form the carrier gel, with a second gel forming liquid which upon gelling forms the separating gel, and which preferably has a considerably reduced specific electric conductivity, as compared to the conductivity of the first gel forming liquid;

4. Evacuating the separating liquid after gelling of the first and second gel forming liquids, thereby defining an elution chamber between a surface of the carrier gel and the opposing surface of the separating gel;

5. Supplying to the elution chamber and evacuating therefrom an elution liquid during the electrophoresis, preferably an elution liquid of a lesser electric conductivity than the separating gel or optionally two elution liquids, the first being supplied adjacent to the separating gel and which has less electric conductivity than the separating gel and the second being supplied adjacent to the carrier gel and which has a conductivity and a portion of glycerin similar to that of the carrier gel.

I have found that using liquids containing glycerine or liquids with similar properties, such as those having a high percentage (60 to 80%) of saccharose or 3M urea for the separating liquid as well as the carrier gel or for one elution liquid which comes into contact with the carrier gel, also causes a desirable stabilization of the separated substances. A low percentage of glycerine or similar liquids already provides the desired effect. However, an admixture of glycerine up to a concentration of about 20 to 30% by volume of the volume of the elution liquid of high electric conductivity, contacting the carrier gel causes a sharp separation of the two elution liquids flowing one on top of the other through the elution chamber. If two elution liquids are used, the other elution liquid, which contacts the lower surface of the separating gel, is free from glycerine and results in a distinct, straight separating line between the two elution liquids. In order to avoid disturbing osmotic effects between the carrie gel and the glycerin-containing elution liquid flowing above it, the carrier gel is preferably prepared with the same or substantially similar glycerin content.

The relative size of the apparatus described herein is not critical and will depend in large measure on the use to which it is to be put.

The process and the apparatus according to the invention permit conducting preparative electrophoreses also on a large scale industrial level while maintaining all of the advantages described. When elution liquid with lower ion concentrations than the separating gels is used for contacting the underside of the separating gel, the separating gel will swell somewhat at the washed surface as a result of which the pores of the gel are enlarged and the migration of the separated substances from the gel is facilitated.

Further advantages and developments of the present invention will be explained in the following figures which serve to further illustrate the invention.

Figure 1:
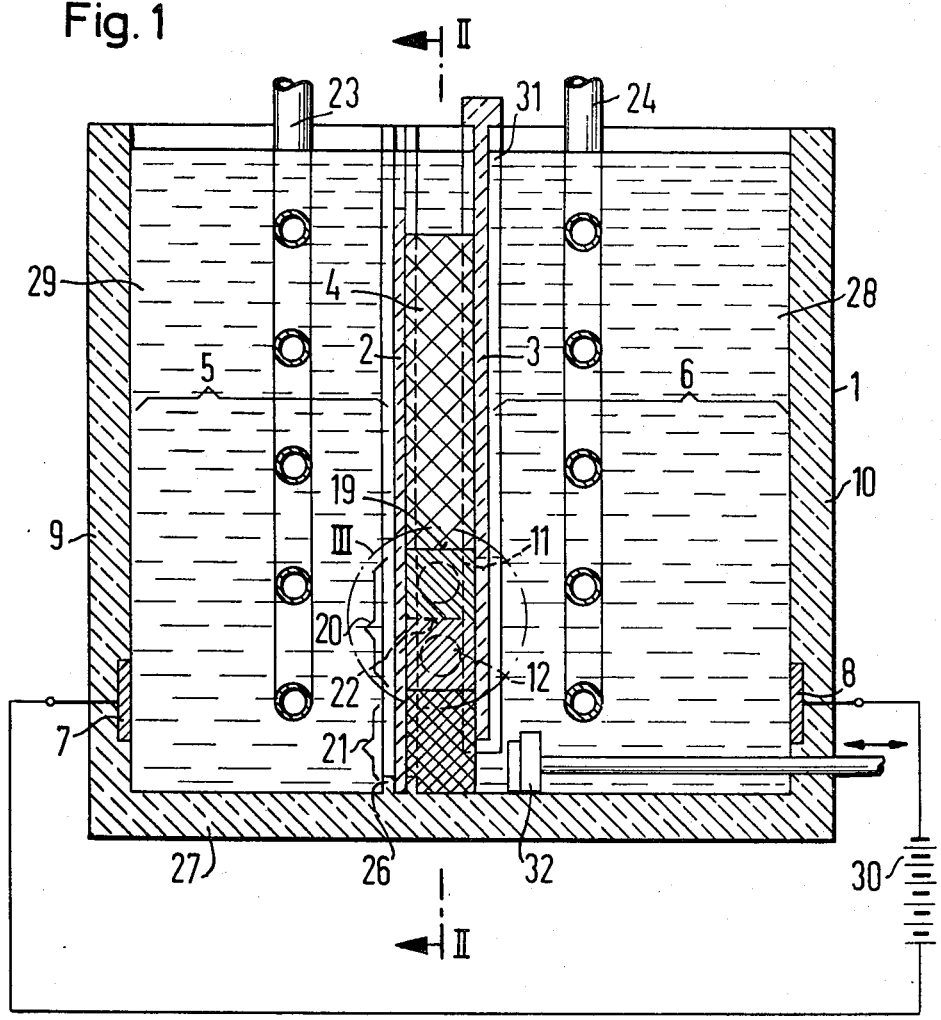
FIG. 1 is a sectional view taken along the line 1—1 of FIG. 2 of the apparatus according to the invention.
Figure 2:
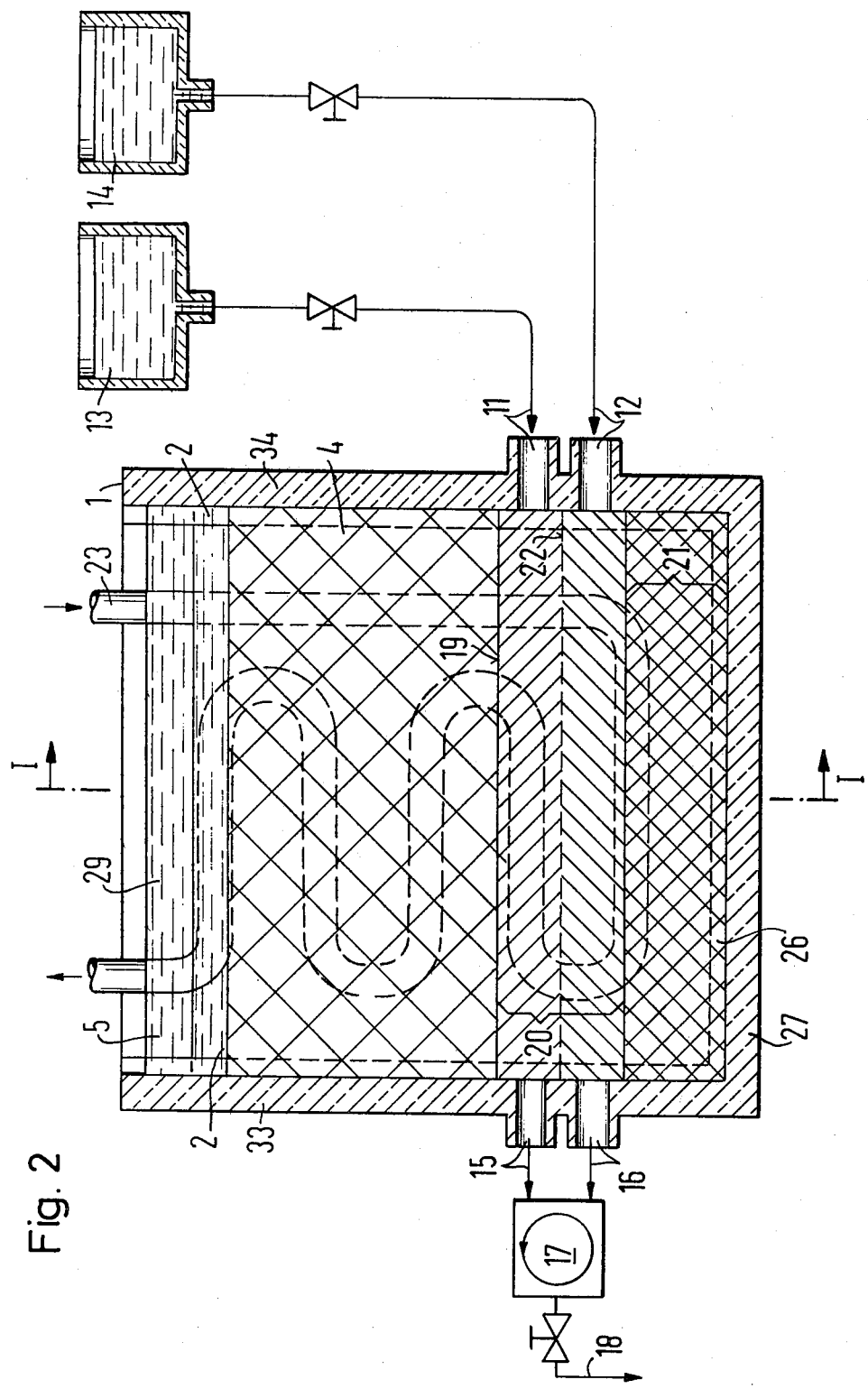
FIG. 2 is a sectional view taken along line II—II of FIG. 1 including, schematically, the inlets and outlets for elution liquids.

According to the FIGS. 1 and 2, the electrophoresis apparatus has a rectangular or square box-shaped container or housing 1. In this housing, plates 2 and 3 are arranged parallel to one another and define a separating chamber 4 which subdivide the box 1 in two chambers 5 and 6 separated from one another, which are filled with buffer liquids 28 and 29. The chambers 5 and 6 constitute buffer containers. The buffer liquids 28 and 29 in the buffer containers 5 and 6 contact electrodes 7 and 8 in the side walls 9 and 10 of the housing 1. The electrodes 7 and 8 are connected to a suitable power source 30. The plate 2, at its upper end, is shortened and extends below the liquid level in chamber 5 so that the buffer liquid 29 of the buffer container 5 contacts the upper surface of the separating chamber 4. On the other hand plate 3 is shortened at its bottom end and is disposed from the floor of housing 1 so that the buffer liquid 28 of the buffer container 6 contacts the lower end of the separating chamber 4 defined by parallel plates 2 and 3.

Plate 2 having a lower edge and two lateral edges is seated in a supporting groove 26, which is disposed on the bottom 27 of the housing 1 and on the side walls 33 and 34. Plate 3 is held in lateral grooves 31 (FIG. 1) in the side walls 33 and 34; in FIG. 2 the holding grooves 31 are not shown. The plates 2 and 3 are supported in a sealed manner in the holding grooves 26 and 31 such that the buffer liquids in containers 5 and 6 are separated from each other. Inlets 11 and 12 are provided for elution liquids which are fed from separate containers 13 and 14 (FIG. 2). The corresponding outlets 15 and 16 (FIG. 2) are connected to a mixing vessel 17 containing suitable mixing apparatus shown schematically. A pipe 18 (FIG. 2) leads from the mixing vessel 17 to a collector (not shown) of various fractions. For the sake of simplicity the inlets and outlets 11, 12 and 15, 16 have been shown round in cross section, but preferably they are relatively thin slits.

From top to bottom the actual separating chamber 4 extends from just below the liquid surface to a line 19, followed by a first extension section 20 containing the separating gel and a second extension section 21 containing the carrier gel. The extension section 20 defines an elution chamber. These areas are shown in FIGS. 1 and 2 with different hatchings for better recognition and differentiation. The first extension section 20 has been subdivided by a broken line 22 which results from the different elution liquids fed in from the containers 13 and 14 via the inlets 11 and 12 of the elution chamber. The direction of travel of the substances that are to be separated in separating chamber 4 is, in the case of the embodiment illustrated, from top to bottom, that is, from the separating chamber 4 in the direction of the extension sections 20 and 21.

Figure 3:
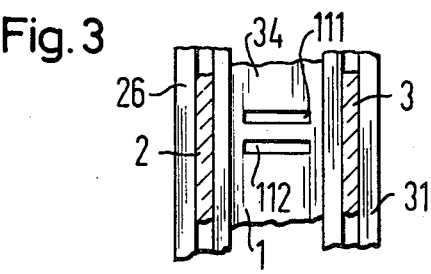
FIG. 3 is a detail III taken from FIG. 1.

In order to emphasize this point, the first extension section 20 has been represented as a greater thickness or height. In actual practice, however, this extension section 20 can be relatively narrow and it is also possible to use inlets and outlets which have configurations other than round, as illustrated. In fact, the horizontal slits 111 and 112 of FIG. 3 opening toward the inside space of the housing 1 in the side walls 33 and 34 of the housing can also be used. The horizontal slits 111 and 112 can be disposed lying closely together, one on top of the other, so that even in the case of use of the double elution system according to the invention and as described above, very thin elution chambers can be applied. Supply of fluid to the horizontal slits 111 and 112, or the discharge of the elution liquids, can take place by way of hoses or channels provided in the lateral walls 33 and 34 of the housing 1, which essentially are disposed at the level of the lower end of the separating chamber 4 as shown in FIG. 2, or at the level of the second extension section 21 and which can also run perpendicularly.

Depending on whether one wants to operate with only one elution system which provides the highest separation sharpness, the first extension section 20 defining the elution chamber, or with two elution systems which also result in high yields, the above separating liquid as described will be layered after filling of the carrier gel into the space formed by the second extension section 21 to such a point that only one pair of inlets and outlets 12–16, and thus only one elution system, or both pairs of inlets and outlets and thus both elution systems, will be in the area of the separating liquid, i.e. in the area of the elution chamber, which develops after the layering of stratifying of the separating gel in the separating chamber 4 and after removal of the separating liquid. The formation of the elution chamber between the two gels (carrier gel in the second extension section 21 and separating gel in the separating chamber 4), according to the invention, is thus made possible without the use of diaphragms in a most direct manner and without the need for additional apparatus. In practice, we have found that the first extension section 20 needs only a height of the order of magnitude of millimeters, and preferably a height of about 1–2 mm. Preparation and filling of the carrier gel and separating gel are described above.

The present invention also contemplates an arrangement in which the separating chamber 4 and the first and the second extension section 20 and 21 are assemblable parts. In this embodiment, the first extension section can, in effect, be determined by installing in the boxlike housing 1 together with the inlets 11 and 12 and the outlets 15 and 16 for the elution liquids. At the time of assembly, the parts of the plates 2 and 3 which constitute the side walls of the first extension section 20 can be firmly glued into the lateral holding grooves 26 and 31. On the other hand, the construction elements of the separating chamber 4 and of the second extension section 21 (parts of the plates 2 and 3) may be individual parts, which can be filled outside of the apparatus with the carrier gel or the separating gel and which can be connected, after gelling, with the first extension section 20 at its top or bottom side.

In the case of a preferred embodiment of the invention, where separating chamber 4, first extension section 20, and second extension section 21 are concerned, the two plates 2 and 3, which are parallel to one another, are of one piece of sheet material and the carrier gel is conveniently poured in the second extension section 21 preferably in the apparatus itself. To accomplish this object a number of arrangements may be used for confining the carrier gel at the lower end of the area. For example, as shown in FIG. 1, a lateral slide 32 may be provided which is disposed and shaped such that it can engage the lower end of the plate 3 in a sealing relationship, and in this manner seal the second extension section 21 with respect to the buffer container 6. On the other hand, it is also possible to use lifting means having closing plates for closing the lower, horizontal end of the second extension section 21.

A particularly advantageous development of the invention will be achieved when the arrangement is such that, considered from the direction of travel of the substances, a plurality of elution chambers is arranged, one on top of the other. It is then possible to pour, for example, gel or gels of different degrees of cross-linking between the individual elution chambers, so that the gel system employed is especially adapted to the substances that are to be separated. During a single electrophoresis run, substances of different molecular sizes can then be obtained simultaneously and with an optimum utilization of the screening effect of the gel ranges employed.

Cooling means, such as cooling pipes 23 and 24, can be disposed in the buffer containers 5 and 6, as in the embodiment shown, disposed laterally of the second extension section 21 and in parallel to the plates 2 and 3. A cooling liquid, such as water, is circulated through the cooling pipes by a pump or other circulation means (not shown). Cooling pipes provide for the even and effective cooling of the heat producing areas of the apparatus and to avoid degeneration of the gel layers.

Gel materials that may be used in the apparatus of the present invention are for instance dextran gels such as "Sephadex" of the firm Pharmacia or polyacrylic amide gels such as "Biogel" of the firm Biocal.

What is claimed is:

1. An apparatus for continuous preparative electrophoresis devoid of diaphragm separators including a housing containing:
    a first buffer vessel for containing a first buffer liquid;
    a second buffer vessel for containing a second buffer liquid,
    an electrode means in said first buffer vessel in contact with said first buffer liquid,
    an electrode means in said second buffer vessel in contact with said second buffer liquid,
    a separation chamber extending in the direction of migration of the substances to be separated and extended at one end by a first extension section and by a second extension section, and having said first buffer vessel adjacent the free, non-extended end of the separation chamber and said second buffer vessel adjacent the other end thereof;
    said free end of the separation chamber in liquid communication with said first buffer vessel and said first buffer liquid, and said separation chamber comprising at least one layer of a solid separating gel;
    said second extension section in liquid communication with said second buffer vessel and said second buffer liquid and comprising a layer of solid carrier gel;
    an elution chamber defined by said first extension section between said separating gel and said carrier gel;
    said separation chamber and said first and second extension sections thereof together defining a plate-like configuration having a substantially rectangular cross-section with two relatively wide sides and two relatively narrow sides;
    inlet means in said housing disposed in the plane of said first extension section and at one of said narrow sides thereof for flowing elution liquids into said separation chamber;
    outlet means in said housing disposed in the plane of said inlet means and said first extension section and in communication with said inlet means for flowing liquids out of said separation chamber, said outlet means being disposed at the other of said narrow sides of said first extension section.

2. The apparatus according to claim 1 further including:
    a second inlet means in said housing disposed in the plane of said first extension section and adjacent to the top surface of said second extension section;
    a second outlet means in said housing disposed in the same plane and communicating with said second inlet means.

3. The apparatus according to claim 2 wherein both of said outlet means are communicated to a mixing means for mixing together the liquids issuing therefrom.

4. The apparatus according to claim 1 including:
    cooling means contained within each of said buffer vessels and positioned in a spaced relationship adjacent said wide sides of said separation chamber and in contact with the buffer liquid contained within each buffer vessel, to cool said separation chamber and in turn said first extension section.

5. The apparatus according to claim 1 including:
    a valve means positioned between said second buffer vessel and said second extension section for controlling liquid communication therebetween.

6. The apparatus according to claim 2 wherein said first and second inlet and outlet means are disposed closely adjacent each other.

7. The apparatus as claimed in claim 6 wherein said closely spaced inlet and outlet means are relatively thin pairs of horizontal slits.

8. The apparatus according to claim 1, wherein the sides of said separation chamber and said first and said second extension sections are each made of continuous plates of glass.

9. The apparatus according to claim 1, wherein said first and said second extension sections are individually and separately attachable to said separation chamber.

10. The apparatus according to claim 1, wherein said first extension section has a height in the order of a few millimeters.

11. The apparatus according to claim 1, wherein said separation chamber is extended by several first and several section extension sections,
    all said several first extension sections being provided with inlet means and outlet means for flowing elution liquids into and out of said several first extension sections,
    the last one of said several second extension sections being in liquid communication with said second buffer vessel.

12. The apparatus according to claim 1, wherein said first extension section and said inlet means and said outlet means for said elution liquids are removably fastened in said housing.

\* \* \* \* \*